United States Patent [19]

Dvorak et al.

[11] Patent Number: 4,731,692

[45] Date of Patent: Mar. 15, 1988

[54] CIRCUIT BREAKER TRIP SOLENOID ASSEMBLY

[75] Inventors: Robert F. Dvorak, Mt. Vernon; John M. Winter, Cedar Rapids, both of Iowa

[73] Assignee: Square D Company, Palatine, Ill.

[21] Appl. No.: 922,967

[22] Filed: Oct. 24, 1986

[51] Int. Cl.$^4$ ............................................... H03H 7/00
[52] U.S. Cl. ..................................... 361/102; 335/22; 335/58
[58] Field of Search ............... 361/87, 93, 94, 95, 361/96, 102; 335/22, 35, 38

[56] References Cited

U.S. PATENT DOCUMENTS

| | | | |
|---|---|---|---|
| 4,019,097 | 4/1977 | Miller et al. | 361/93 |
| 4,085,393 | 4/1978 | Grenier | 335/38 X |
| 4,110,717 | 8/1978 | Grenier | 335/22 |
| 4,213,165 | 7/1980 | Zylstra et al. | 361/94 |
| 4,521,823 | 6/1985 | Link | 361/38 |

Primary Examiner—A. D. Pellinen
Assistant Examiner—Derek S. Jennings
Attorney, Agent, or Firm—Mary R. Jankousky; Thomas B. Lindgren; Richard T. Guttman

[57] ABSTRACT

An electronic circuit breaker having a trip solenoid assembly. The trip solenoid assembly includes a permanent magnet, plunger, trip coil and assist coil and is positioned adjacent to a phase conductor. At high current levels the phase conductor generates a flux that may cause the circuit breaker to nuisance trip. An assist coil is wound adjacent the trip coil. The assist coil is energized only when the current through the circuit breaker is of such a level so as to cause nuisance tripping. The assist coil is not energized during that time period when the trip coil is energized.

9 Claims, 6 Drawing Figures

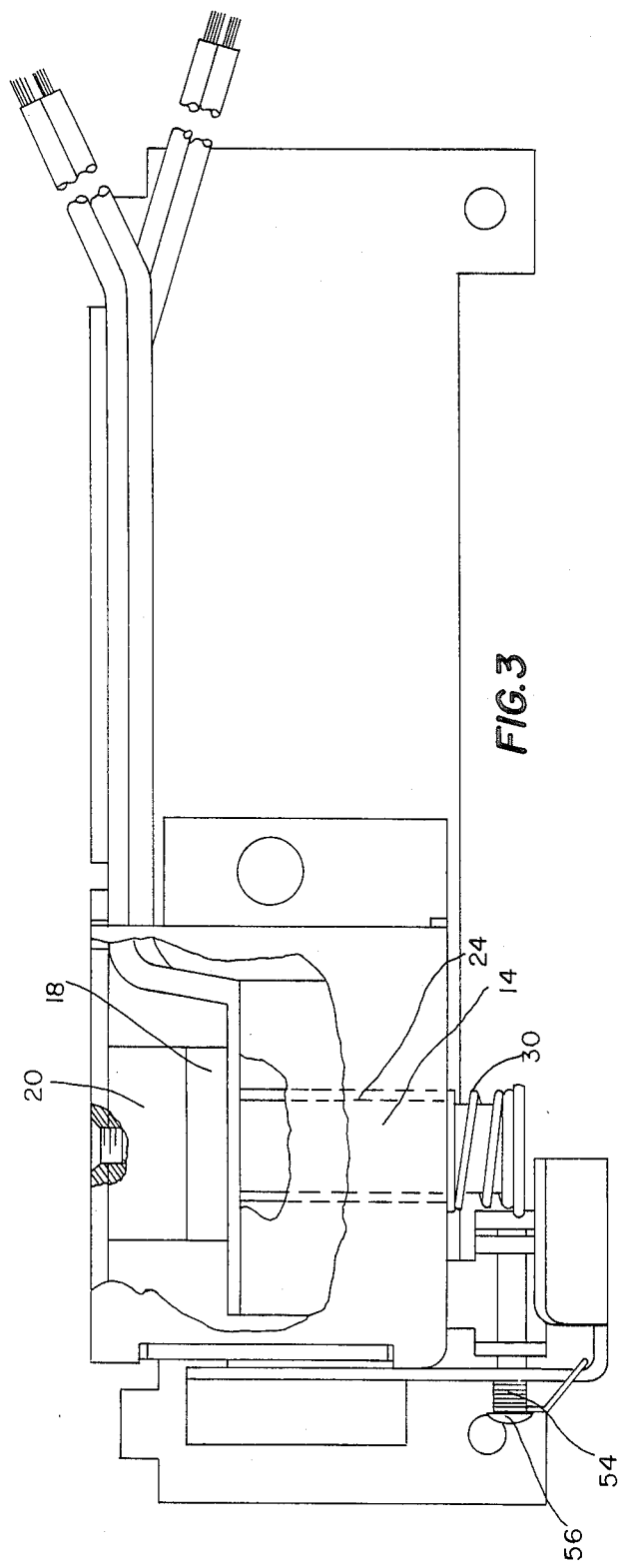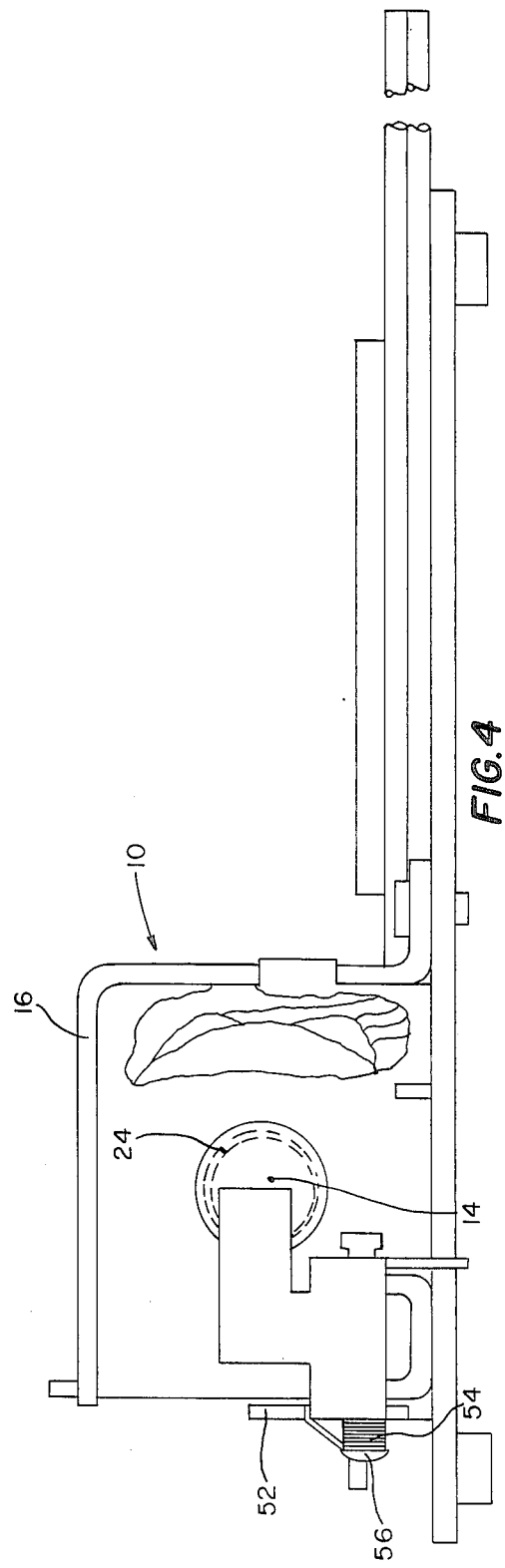

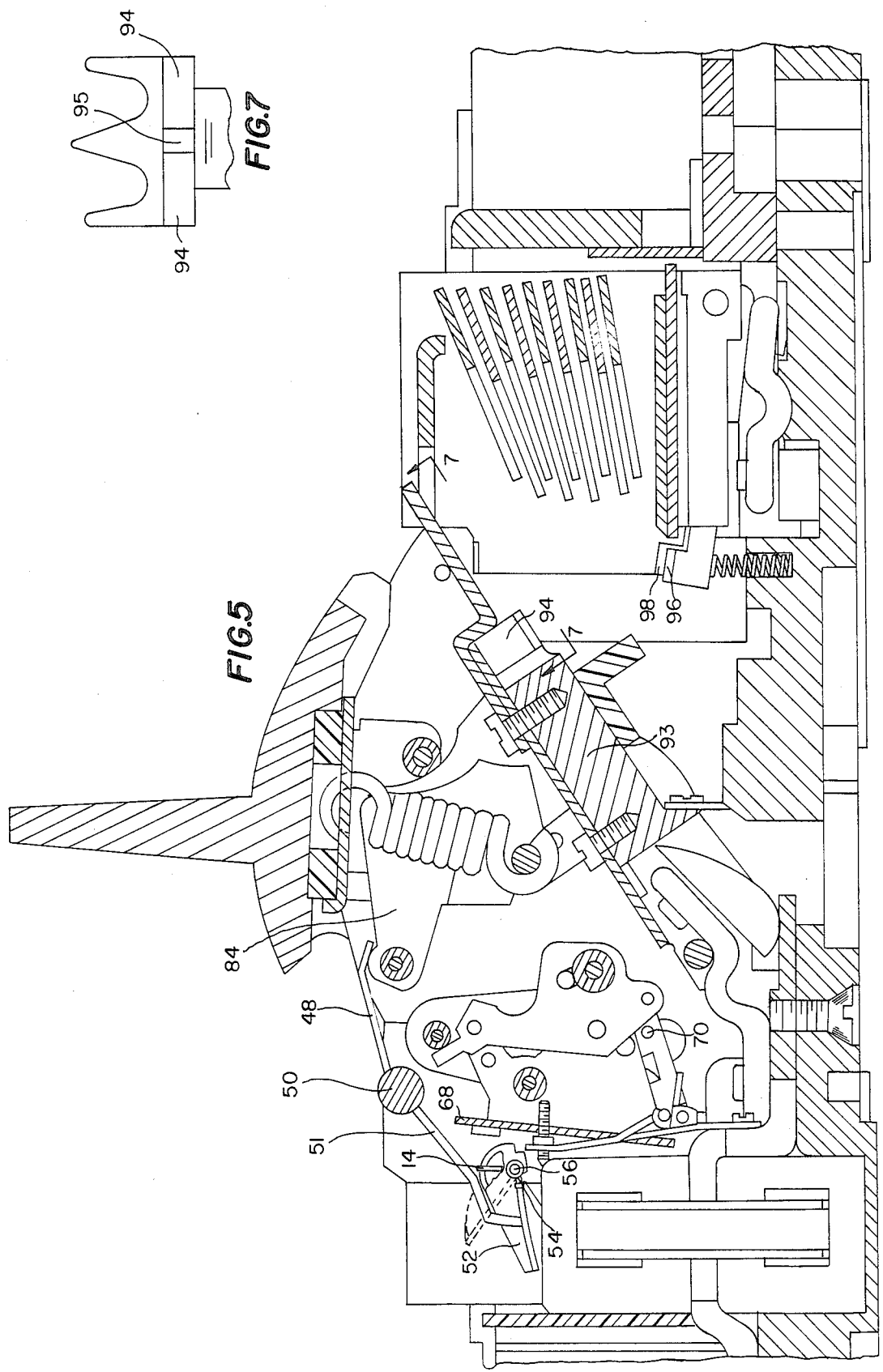

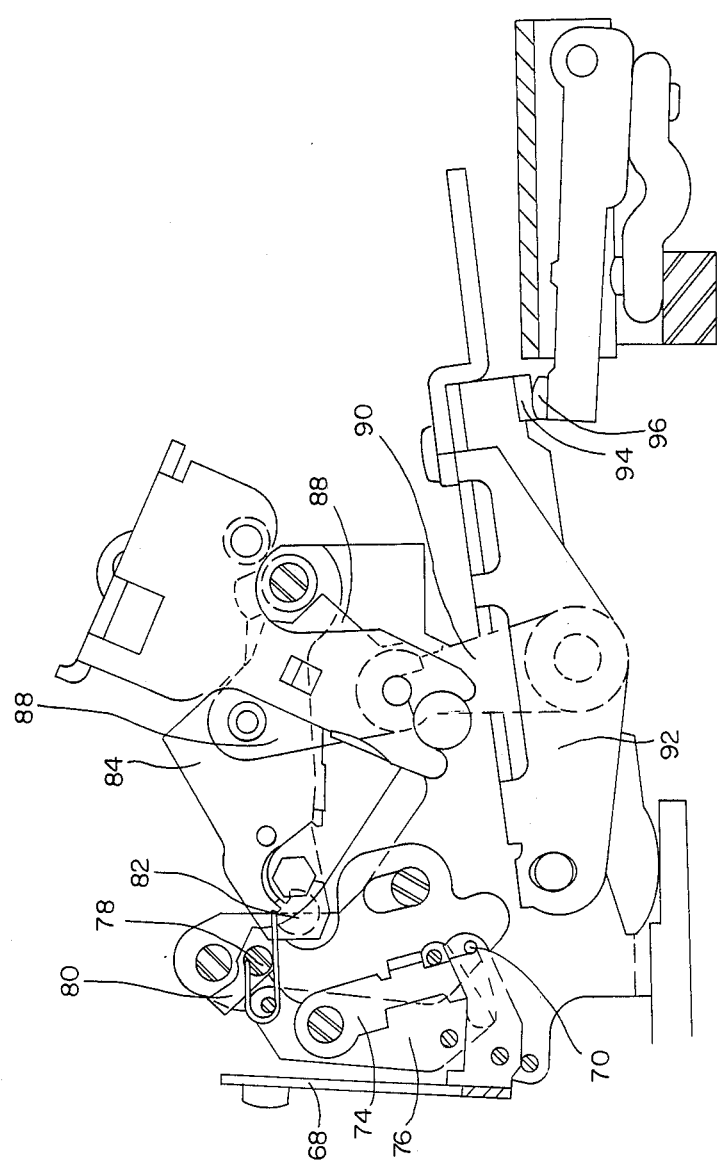

CIRCUIT BREAKER TRIP SOLENOID ASSEMBLY

This invention relates to a circuit breaker having a trip solenoid assembly and in particular to a circuit breaker having a high current carrying capability.

CROSS REFERENCE TO RELATED APPLICATION

The present invention is related to material disclosed in the following copending U.S. applications, all of which are assigned to the same assignee of the present application and are herein incorporated by reference:

Ser. No. 922,966, "Circuit Breaker Arc Stack Assembly" filed Oct. 24, 1986 by J. M. Winter;

Ser. No. 922,577, "Trident Arc Horn for Circuit Breaker" filed Oct. 24, 1986 by A. A. Maulandi, K. J. Green, G. A. Volesky;

Ser. No. 922,968, "Circuit Breaker with Positive Contact Indication" filed Oct. 24, 1986 by J. M. Winter, D. R. Schiefen;

Ser. No. 922,576, "Circuit Breaker Contact Assembly" filed Oct. 24, 1986 by J. M. Winter;

Ser. No. 922,575, "Electronic Circuit Breaker with Withstand Capability" filed Oct. 24, 1986 by J. M. Winter.

BACKGROUND OF THE INVENTION

As the withstand requirements and interruption requirements of circuit breakers increase, circuit breakers must physically withstand the forces generated by the higher current. Additionally, the higher currents create a magnetic flux which may affect the operation of the circuit breaker. With advances in technology circuit breakers are designed in smaller housings, thus adding to the problem of the undesirable effects of magnetic flux. In particular, where a circuit breaker has a high withstand requirement and the phase conductor is located close to the trip solenoid assembly, nuisance tripping can occur.

A trip solenoid assembly often includes a housing, plunger, spring, permanent magnet and trip coil. The permanent magnet and spring generally exert opposing forces on the plunger. As the trip coil is energized, it generates a sufficient flux opposing the permanent magnet to allow the spring to move the plunger away from the permanent magnet.

When the trip solenoid assembly is positioned in relatively close proximity to a phase conductor, a high current through the phase conductor will create a flux sufficient to upset the balance between the other forces acting on the plunger. If the current through the phase conductor is high, for example, at current levels at or near a withstand rating, the plunger may move to the tripped position even though the trip coil has not been energized. It is desirable for the plunger to remain in its latched position until the electronic trip unit has issued a trip signal.

In the prior art this type of nuisance tripping was avoided by positioning the trip solenoid assembly a greater distance away from the phase conductor or by increasing the margin between the permanent magnet force and the spring force. The latter has the disadvantage of requiring increased energy to unlatch the trip solenoid and circuit breaker operating mechanism. In the prior art this type of nuisance tripping was not as great a concern with those circuit breakers that did not have withstand capabilities.

There is a need for a circuit breaker having a trip solenoid assembly that can accommodate a large current through a nearby phase conductor without nuisance tripping while requiring only a low energy power source for unlatching the operating mechanism.

These and other features of the invention become more readily apparent from the following description, claims and drawings.

BRIEF DESCRIPTION OF THE DRAWINGS

FIG. 3 is a top view of a trip solenoid assembly.

FIG. 4 is an end view of the trip solenoid assembly of FIG. 3.

FIG. 5 is a side view of a circuit breaker in the tripped position.

FIG. 6 is a side view of a portion of circuit breaker in the closed position.

FIG. 7 is a partial bottom view of the moving contacts and arc horn taken along lines 7—7 of FIG. 5.

DESCRIPTION OF THE INVENTION

Figure 1:
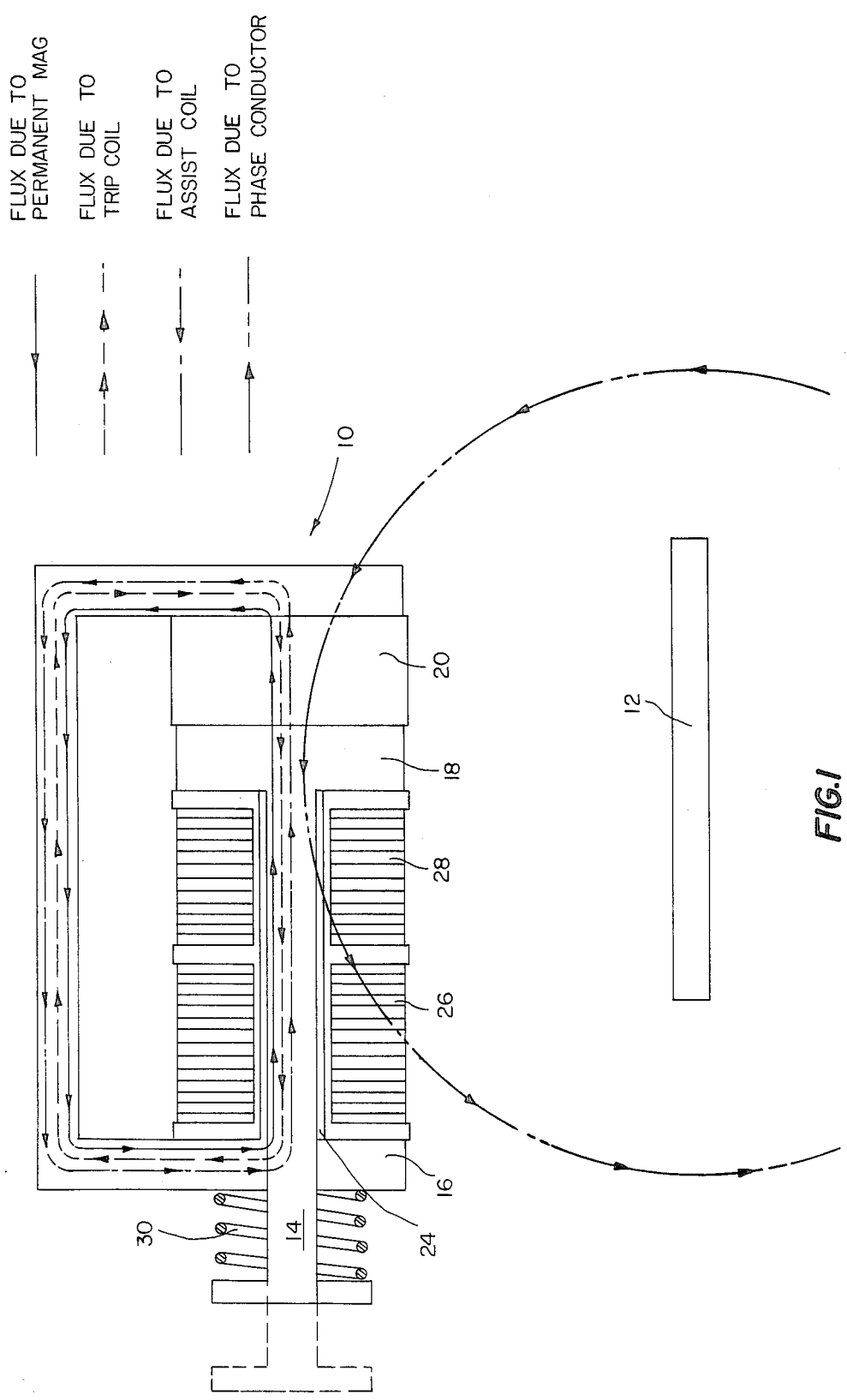
FIG. 1 is a schematic diagram of a trip solenoid assembly and associated flux lines.

Referring now to the drawings and in particular to FIG. 1, a trip coil assembly, indicated generally as numeral 10, is shown adjacent a phase conductor 12. The trip coil assembly 10 includes a ferrous metal plunger 14 that moves reciprocatingly within the frame 16 of the trip coil assembly. At all times except when the trip coil assembly is being energized, the plunger 14 is positioned adjacent a flux concentrator 18 that is positioned adjacent a permanent magnet 20. Surrounding the plunger 14 is a metal sleeve 24 around which is wound a trip coil 26 and assist coil 28. The trip coil 26 and assist coil 28 may be positioned side by side, as shown in FIG. 1, or may be wound one on top of the other.

Opposing the pull of the permanent magnet 20 is a compression spring 30. The force of the spring 30 on the plunger 14 is less than the attractive force of the magnet 20 so that the plunger 14 is positioned adjacent the flux concentrator 18 when only the magnet force and the spring force act on the plunger 14.

When the electronic trip unit 66 (partially shown in FIG. 2) senses the existence of an overcurrent that exceeds predetermined time and current characteristics, the trip unit energizes the trip coil 26, causing the plunger 14 to move to the extended position, as shown by the dotted lines in FIG. 1. The flux lines in FIG. 1 indicate the magnetic flux exerted on the plunger by the various components of the trip solenoid assembly during that half of each alternating current cycle when the phase conductor flux opposes the permanent magnet flux.

The permanent magnet flux and assist coil flux act to hold the plunger against the flux concentrator 18, while the trip coil flux and phase conductor flux both act to assist the movement of the plunger to the extended position. The assist coil 28 is energized only when the current through the phase conductor 12 increases to a level such that the phase conductor flux overcomes the permanent magnet flux sufficiently that the spring forces the plunger 14 to the extended position. The energized assist coil 28 creates a flux which aids the permanent magnet in retaining the plunger 14 adjacent the flux concentrator 18 until the trip coil 26 is energized. The assist coil 28 is de-energized during the time period the trip coil 26 is energized since the assist coil creates flux in opposition to the trip coil flux.

When the trip coil 26 is energized, either remotely or because of an overcurrent, the plunger 14 moves to the extended position. The extended plunger hits the trip lever 68, unlatching the circuit breaker. Upon the plunger 14 hitting the trip lever 68, the trip lever 68 rotates clockwise allowing the trip lever pin 70 to release the secondary latch 74. The secondary latch 74 and quick trip latch 76 rotate counterclockwise, releasing the cradle latch roller 78 and allowing the cradle latch 80 to rotate counterclockwise. The cradle roller 82 then moves upward as the cradle 84 rotates clockwise, pulling the upper link 88, lower link 90, blade carrier 92 and upper blade 93 upwards to separate the moving main contacts 94 and moving arcing contact 95 from the lower main contacts 96 and the lower arcing contact 98.

The plunger 14 is automatically reset upon the breaker tripping. When the breaker trips, the cradle 84 moves upwards, moving a flat spring 48 that rotates the common trip bar 50. The trip bar 50 is attached to a lever 51 in the center pole. The lever 51 then rotates to pivot the reset bracket 52, forcing the plunger 14 into contact with the flux concentrator. The plunger 14 remains in that position until the trip coil 26 is again energized. The reset bracket 52 is returned to the proper position adjacent the plunger 14 by a reset spring 54, which is a coil spring wound about the pin 56 about which the reset bracket 52 pivots.

Figure 2:
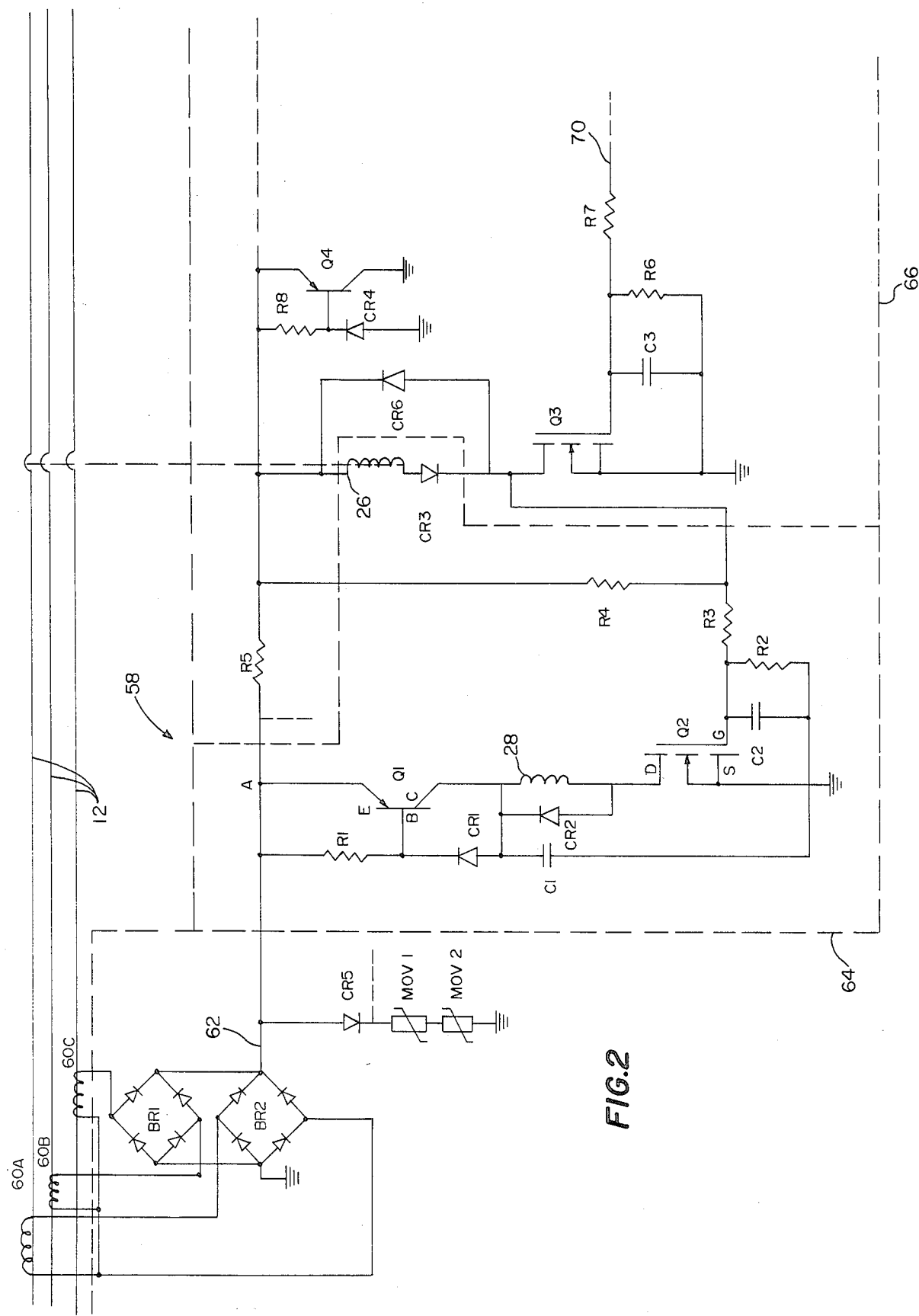
FIG. 2 is an electrical diagram of a portion of the trip unit.

The energization of the assist coil 28 is controlled by the assist coil control circuit, indicated generally as 58 in FIG. 2. The current through each phase conductor 12 is monitored by a current transformer. The current transformer secondary coils 60a, 60b and 60c are connected through bridges BR1 and BR2 to produce a rectified full wave current on line 62. The control circuit is protected from high energy generated by the current transformer by a diode CR5, and metal oxide varistors MOV1 and MOV2, connected in series between line 62 and ground. Only that portion of the control circuit that relates directly to the energization of the assist coil is described herein.

Line 62 is connected concurrently to resistor R1 and to the emitter of transistor Q1. The base of transistor Q1 is connected to the other side of resistor R1 and to the cathode of zener diode CR1. The anode of zener diode CR1 and the collector of transistor Q1 are connected concurrently to an assist coil 28, to the cathode of diode CR2 and to a grounded capacitor C1. The anode of diode CR2 and the other side of assist coil 28 are connected to the drain of field effect transistor (FET) Q2. The source of transistor Q2 is grounded while the gate of transistor Q2 is connected concurrently to resistor R3 and to a parallel grounded combination of capacitor C2 and resistor R2. The second side of resistor R3 is connected through resistor R4 to line 62 and also to the drain of field effect transistor Q3.

Resistors R1, R2, R3, R4, capacitors C1 and C2, diodes CR1 and CR2, assist coil 28 and transistors Q1 and Q2 are included in the assist coil energization circuit 64 as shown in FIG. 2. The assist coil energization circuit 64 is separated electrically from the electronic trip unit 66 by a resistor R5, positioned on line 62 between the connection with the emitter of transistor Q1 and the connection to trip coil 26. The other end of trip coil 26 is connected to the anode of diode CR3. The cathode of diode CR3 is connected to the drain of field effect transistor Q3.

A free-wheeling diode CR6 is connected across the trip coil 26 and diode CR3. The source of transistor Q3 is grounded. The gate of transistor Q3 is connected to a parallel grounded combination of capacitor C3 and resistor R6. The gate of transistor Q3 is also connected through resistor R7 to line 70 which leads to the remainder of the control circuit for the electronic trip unit. Line 70 receives the trip signal from the control circuit to trip the circuit breaker, as will be described later.

Line 62 is also connected concurrently to resistor R8 and to the emitter of transistor Q4. The base of transistor Q4 is connected to the other side of resistor R8 and to the cathode of grounded zener diode CR4. The collector of transistor Q4 is grounded. Line 62 is then connected to the remainder of the electronic trip unit.

When the breaker is in the closed position and the current through the phase conductors 12 is within acceptable limits, the current transformers 60a, 60b and 60c will supply current to line 62. The voltage at line 62 is proportional to the highest of the current transformer secondary currents and therefore is proportional to the highest of the phase currents. No current will flow through transistor Q1 because the breakdown voltage of zener diode CR1 has not yet been exceeded. Hence, no current will flow through assist coil 28. A small amount of current will flow through trip coil 26, although the current flow will be insufficient to activate the trip coil. This current will be supplied to the gate of transistor Q2. No current will flow through assist coil 28 at this time since transistor Q2 is not yet conducting.

When the current through phase conductor 12 reaches a level such that it creates a flux nearly sufficient to release plunger 14 to the extended position, it is desirable to energize the assist coil 28. At this current level, the breakdown voltage of zener diode CR1 will be exceeded, turning on transistor Q1. Current will flow through assist coil 28 to maintain the plunger in the non-extended position. Transistor Q2 will also be conducting at this time.

When the current through the phase conductor exceeds a predetermined level, the electronic trip unit will energize the trip coil after a predetermined time delay. A trip signal will be received on line 70 from the remainder of the electronic trip unit to energize the gate of transistor Q3. Transistor Q3 will be turned on, allowing sufficient current to flow through the trip coil 26 to energize the trip coil, unlatching the operating mechanism and opening the circuit breaker contacts. The current flowing through trip coil 26 and resistor R4 will be shunted to ground through transistor Q3, shutting off the gate of transistor Q2. Transistor Q2 will become non-conducting, opening the return current path for energizing assist coil 28. Thus, assist coil 28 will not be energized during the time period when the trip coil 26 is energized, approximately a few milliseconds.

Transistor Q4, resistor R8 and zener diode CR4 form a shunt regulator circuit which maintain the voltage of the electronic trip unit at approximately ten volts. The protective components described herein for diode CR5, metal oxide varistors MOV1 and MOV2 limit the voltage of the assist coil energization circuit 64 and electronic trip unit input to approximately 64 volts. These components are chosen to clamp the voltage on line 62 sufficiently high so as not to interfere with the operation of the assist coil energization circuit. The disparity between the maximum voltage levels of the assist coil energization circuit 64 and electronic trip unit 66 is allowed by inserting the current metering resistor R5.

While the invention has particularly been shown and described with reference to a preferred embodiment, it will be understood by those skilled in the art that variations in form, construction and arrangement may be made therein without departing from the spirit and scope of the invention.

We claim:

1. A circuit breaker comprising:
   a pair of separable contacts having an open position and a closed position, said contacts being separated in the open position, said contacts being engaged in the closed position;
   a conductor;
   tripping means for moving said contacts to the open position upon activation;
   a trip solenoid assembly positioned adjacent said conductor, said trip solenoid assembly including a ferrous metal plunger, a trip coil and an assist coil, the plunger moving within the trip coil and assist coil, the plunger having an extended position and a non-extended position, the plunger generally being in the non-extended position when said contacts are in the closed position, upon the current through said conductor reaching a predetermined overcurrent level, said trip coil being enerized for a certain time period to move said plunger to the extended position activating said tripping means, said assist coil being energized upon the current through said conductor reaching a predetermined first level.

2. A circuit breaker as claimed in claim 1 wherein said trip solenoid assembly additionally comprises a permanent magnet, the plunger being adjacent said permanent magnet when the plunger is in the non-extended position.

3. A circuit breaker as claimed in claim 1 wherein said assist coil is not energized during the time period said trip coil is energized.

4. A circuit breaker as claimed in claim 1 wherein the current through said conductor creates a flux tending to move the plunger to the extended position without the energization of said trip coil, wherein said predetermined first level is not larger than the current level that forces the plunger to the extended position without the energization of said trip coil.

5. The circuit breaker as claimed in claim 1 wherein the plunger, upon reaching the extended is immediately engaged by said tripping means and returned to the non-extended position.

6. A circuit breaker comprising:
   a pair of separable contacts having an open position and a closed position;
   trip means for moving said contacts between the open position and the closed position, said trip means moving said contacts to the open position upon activation;
   a plunger activating said trip means upon said plunger being moved in a first direction;
   a trip coil surrounding said plunger, said trip coil moving said plunger in a first direction upon said trip coil being energized;
   an assist coil positioned adjacent said trip coil, upon said assist coil being energized, said assist coil exerting force on said plunger in a second direction opposite to the first direction; and
   a phase conductor positioned proximate to said plunger;
   sensing means for sensing the current through said phase conductor, said sensing means energizing said trip coil upon the phase conductor current reaching a predetermined overcurrent level, said sensing means energizing said assist coil upon the phase conductor current reaching a predetermined first level.

7. A circuit breaker as claimed in claim 6 wherein said sensing means comprises a first switch connected to the first side of said assist coil, wherein said first switch is turned on when the phase conductor current reaches the first predetermined level.

8. A circuit breaker as claimed in claim 6 wherein said sensing means additionally comprises a second switch connected to the second side of said assist coil, wherein said second switch is turned on at all times except when said trip coil is energized.

9. A circuit breaker as claimed in claim 7 wherein said sensing means additionally comprises a third switch connected to said trip coil and to said second switch, said third switch turning on said trip coil and turning off said second switch upon the phase conductor current reaching the predetermined overcurrent level.

* * * * *